(12) United States Patent
Walenty et al.

(10) Patent No.: US 10,408,633 B2
(45) Date of Patent: Sep. 10, 2019

(54) SYSTEM AND METHOD FOR DYNAMIC ROUTE GUIDANCE

(71) Applicants: Denso International America, Inc., Southfield, MI (US); DENSO CORPORATION, Kariya, Aichi-pref (JP)

(72) Inventors: Scott Walenty, Farmington Hills, MI (US); Brandon Simoncic, Copiague, NY (US)

(73) Assignee: DENSO International America, Inc., Southfield, MI (US)

( * ) Notice: Subject to any disclaimer, the term of this patent is extended or adjusted under 35 U.S.C. 154(b) by 118 days.

(21) Appl. No.: 15/690,973

(22) Filed: Aug. 30, 2017

(65) Prior Publication Data

US 2019/0063941 A1 Feb. 28, 2019

(51) Int. Cl.
| | |
|---|---|
| *G01C 21/36* | (2006.01) |
| *G01C 21/34* | (2006.01) |
| *G06Q 10/04* | (2012.01) |
| *G06Q 50/30* | (2012.01) |
| *H04W 4/024* | (2018.01) |
| *G08G 1/16* | (2006.01) |
| *H04W 4/80* | (2018.01) |
| *H04W 4/02* | (2018.01) |
| *H04W 4/46* | (2018.01) |

(52) U.S. Cl.
CPC ....... *G01C 21/362* (2013.01); *G01C 21/3438* (2013.01); *G01C 21/3626* (2013.01); *G01C 21/3667* (2013.01); *G06Q 10/047* (2013.01); *G06Q 50/30* (2013.01); *H04W 4/024* (2018.02); *G08G 1/163* (2013.01); *H04W 4/023* (2013.01); *H04W 4/46* (2018.02); *H04W 4/80* (2018.02)

(58) Field of Classification Search
CPC .............. G01C 21/362; G01C 21/3626; G01C 21/3667; H04W 4/80; G08G 1/163
USPC ........................................................ 701/428
See application file for complete search history.

(56) References Cited

U.S. PATENT DOCUMENTS

| | | | |
|---|---|---|---|
| 7,286,825 B2 | 10/2007 | Shishido et al. | |
| 7,613,563 B2 | 11/2009 | Haegebarth et al. | |
| 8,527,196 B2 | 9/2013 | Alasry et al. | |
| 9,141,112 B1 | 9/2015 | Loo et al. | |
| 9,275,549 B2* | 3/2016 | Ando | G08G 1/22 |
| 9,746,334 B1* | 8/2017 | Mahajan | G01C 21/3438 |
| 2008/0154499 A1* | 6/2008 | Tanaka | G01C 21/362 |
| | | | 701/431 |
| 2014/0005941 A1* | 1/2014 | Paek | G01C 21/3438 |
| | | | 701/533 |
| 2016/0076896 A1* | 3/2016 | Konig | G01C 21/26 |
| | | | 701/411 |
| 2016/0273930 A1* | 9/2016 | Wada | G01C 21/3438 |

* cited by examiner

*Primary Examiner* — Krishnan Ramesh
(74) *Attorney, Agent, or Firm* — Harness, Dickey & Pierce, P.L.C.

(57) ABSTRACT

A route guidance system for a navigation system includes a communication unit, a navigation unit, and a display unit. The communication unit transmits and receives vehicle coordinates from a remote lead vehicle. The navigation unit determines a route and provides directions for a user to the remote lead vehicle. The display unit displays a location of the user, the coordinates of the remote lead vehicle, the route from the user to the remote lead vehicle, and the directions.

20 Claims, 13 Drawing Sheets

SYSTEM AND METHOD FOR DYNAMIC ROUTE GUIDANCE

FIELD

The present disclosure relates to navigation and route guidance, and, specifically, to a system and method for dynamic route guidance.

BACKGROUND

This section provides background information related to the present disclosure which is not necessarily prior art.

Navigation systems are widely used in many vehicles. People enjoy the ease of entering an address and receiving directions to a destination. Some vehicles are equipped with a navigation or route guidance device. The route guidance device may communicate with a Global Positioning System (GPS) to determine the current geographic location of the vehicle and may include a mapping component to plot the current geographic location for a user.

The route guidance device may further utilize the mapping component to present a map illustrating an origin point, a destination point, and a suggested route. As the driver follows the suggested route, the route guidance system may provide audio and/or visual instructions to the driver.

Often, drivers of different vehicles are caravanning to the same location. It can sometimes be tricky, and dangerous, for one driver to follow another. It is easy for the follower to get separated from the leader by events such as other drivers cutting the follower off, traffic lights turning red during the following, or a leader that likes to drive faster than the follower. What often results is a follower driving recklessly to continue following the leader or a follower getting lost and/or needing to call or text the leader, which is also a safety concern during driving. Further, if the follower is not familiar with the area, or if the leader wants to stop and have the follower join him, there is a need to communicate easily with the follower.

SUMMARY

This section provides a general summary of the disclosure, and is not a comprehensive disclosure of its full scope or all of its features.

A route guidance system for a navigation system includes a communication unit, a navigation unit, and a display unit. The communication unit transmits and receives vehicle coordinates from a remote lead vehicle. The navigation unit determines a route and provides directions for a user to the remote lead vehicle. The display unit displays a location of the user, the coordinates of the remote lead vehicle, the route from the user to the remote lead vehicle, and the directions.

The route guidance system may further include a communication unit that transmits or receives a friendship request to or from the remote lead vehicle.

The route guidance system may further include a communication unit that transmits or receives a lead me request or a follow me request to or from the remote lead vehicle.

The route guidance system may further include a communication unit that transmits and receives the vehicle coordinates over wireless communication to and from the remote lead vehicle.

The route guidance system may further include a communication unit that transmits and receives the vehicle coordinates over vehicle to vehicle communication to and from the remote lead vehicle.

The route guidance system may further include a dedicated short range communication system that transmits and receives the vehicle coordinates to and from a dedicated short range communication system on the remote lead vehicle.

The route guidance system may further include a navigation screen displaying the location of the user, the coordinates of the remote lead vehicle, the route from the user to the remote lead vehicle, and the directions.

The route guidance system may further include a navigation screen in a vehicle.

The route guidance system may further include a navigation screen on a mobile navigation system, a mobile phone, or a smart phone.

The route guidance system may further include a navigation unit that continuously routs the user to the remote lead vehicle.

A method of route guidance for a navigation system includes transmitting and receiving, by a communication unit, vehicle coordinates from a remote lead vehicle; determining, by a navigation unit, a route and providing directions for a user to the remote lead vehicle; and displaying, by a display unit, a location of the user, the coordinates of the remote lead vehicle, the route from the user to the remote lead vehicle, and the directions.

The method may further include transmitting or receiving, by the communication unit, a friendship request to or from the remote lead vehicle.

The method may further include transmitting or receiving, by the communication unit, a lead me request or a follow me request to or from the remote lead vehicle.

The method may further include transmitting and receiving, by the communication unit, the vehicle coordinates over wireless communication to and from the remote lead vehicle.

The method may further include transmitting and receiving the vehicle coordinates over vehicle to vehicle communication to and from the remote lead vehicle.

The method may further include continuously routing, by the navigation unit, the user to the remote lead vehicle.

The method may further include notifying the user, by the navigation unit, of upcoming turns already made by the remote lead vehicle.

The method may further include sharing, by the communication unit, music between the user and the remote lead vehicle.

The method may further include displaying, by the display unit, a notification when the user passes the remote lead vehicle.

The method may further include distinguishing, by the display unit, between the user and the remote lead vehicle on the display.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
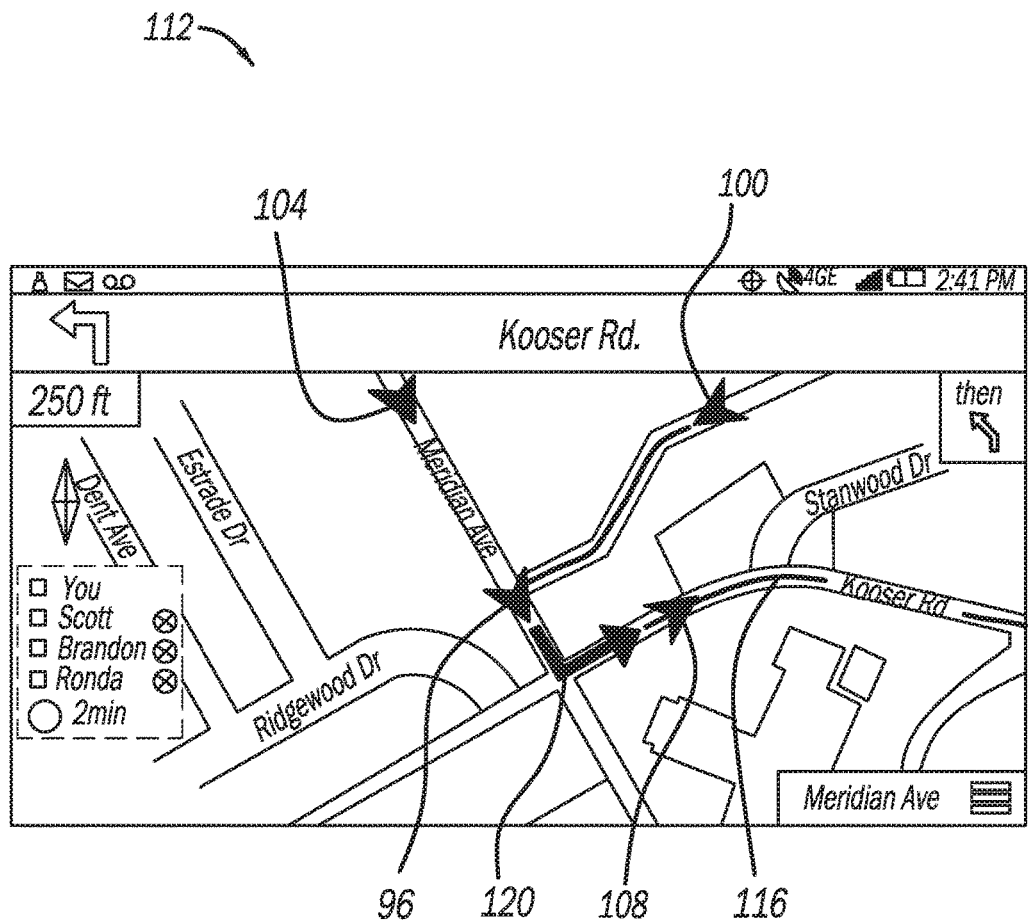

FIG. 6 a screen shot of a navigation system equipped with a Follow a Friend system illustrating a lead vehicle and multiple follow vehicles according to the present disclosure.

Figure 7:
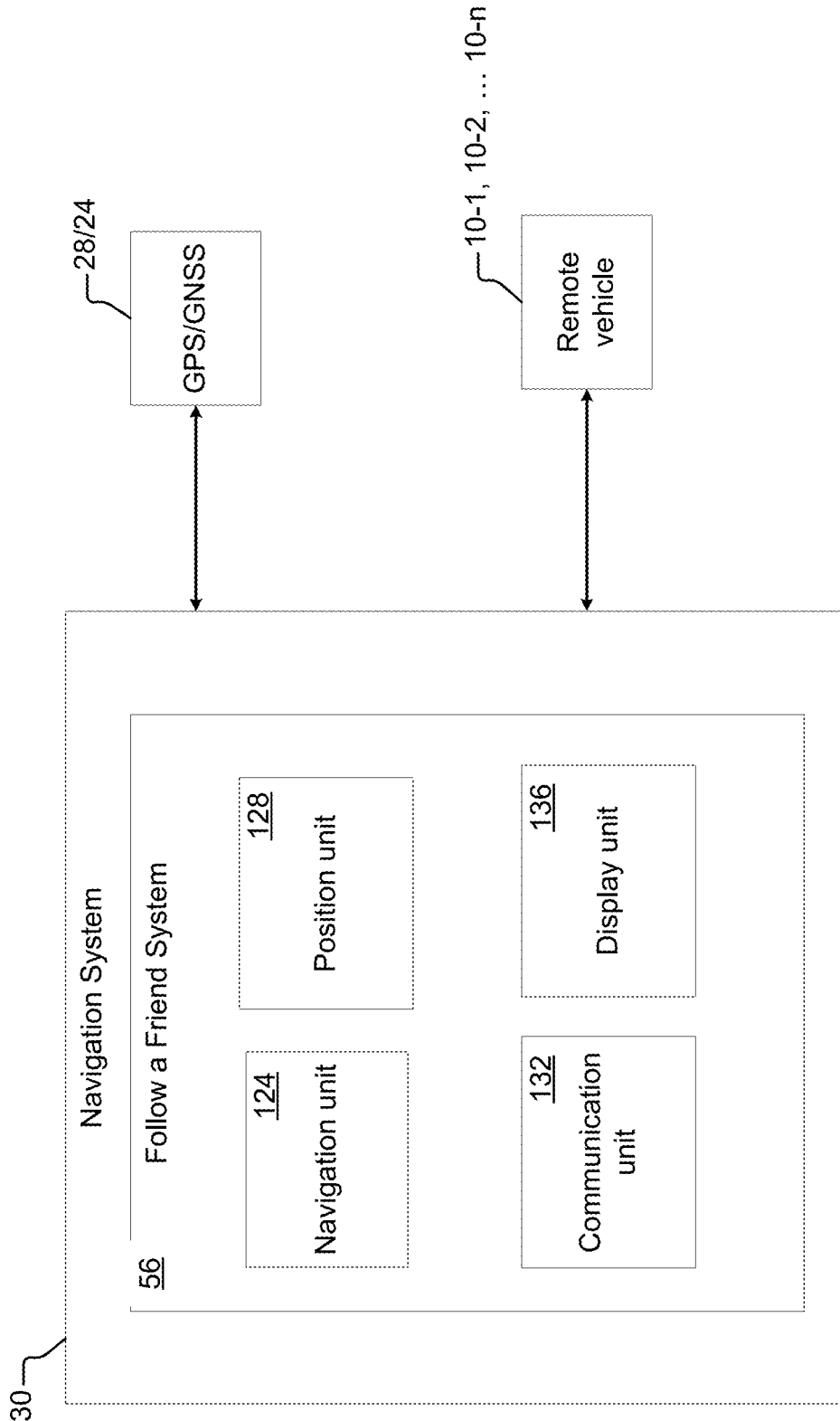

FIG. 7 is a block diagram for the Follow a Friend system according to the present disclosure.

Figure 8:
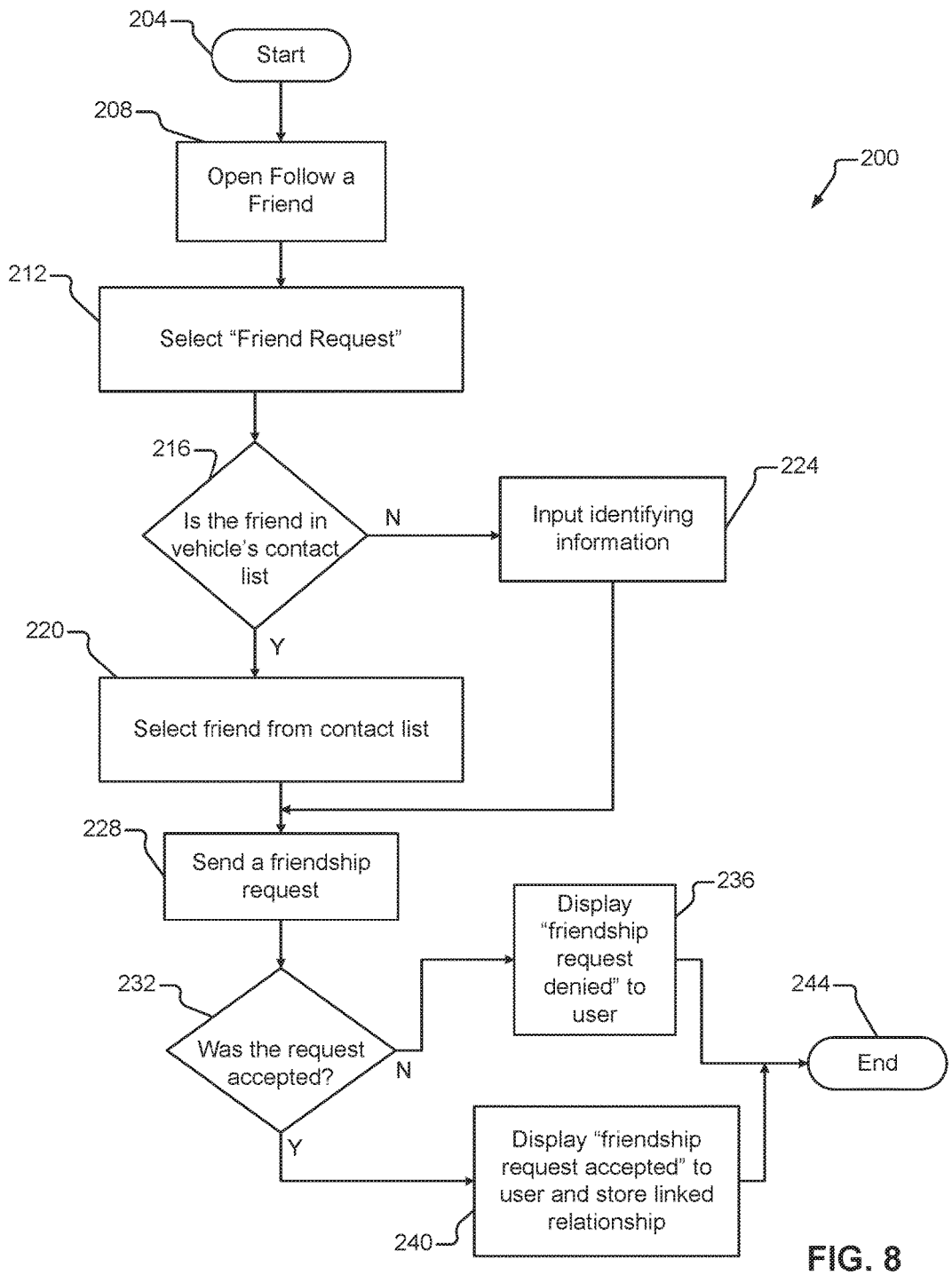

FIG. 8 is a flow chart for a method for requesting to link or establish a friendship in the Follow a Friend system according to the present disclosure.

Figure 9:
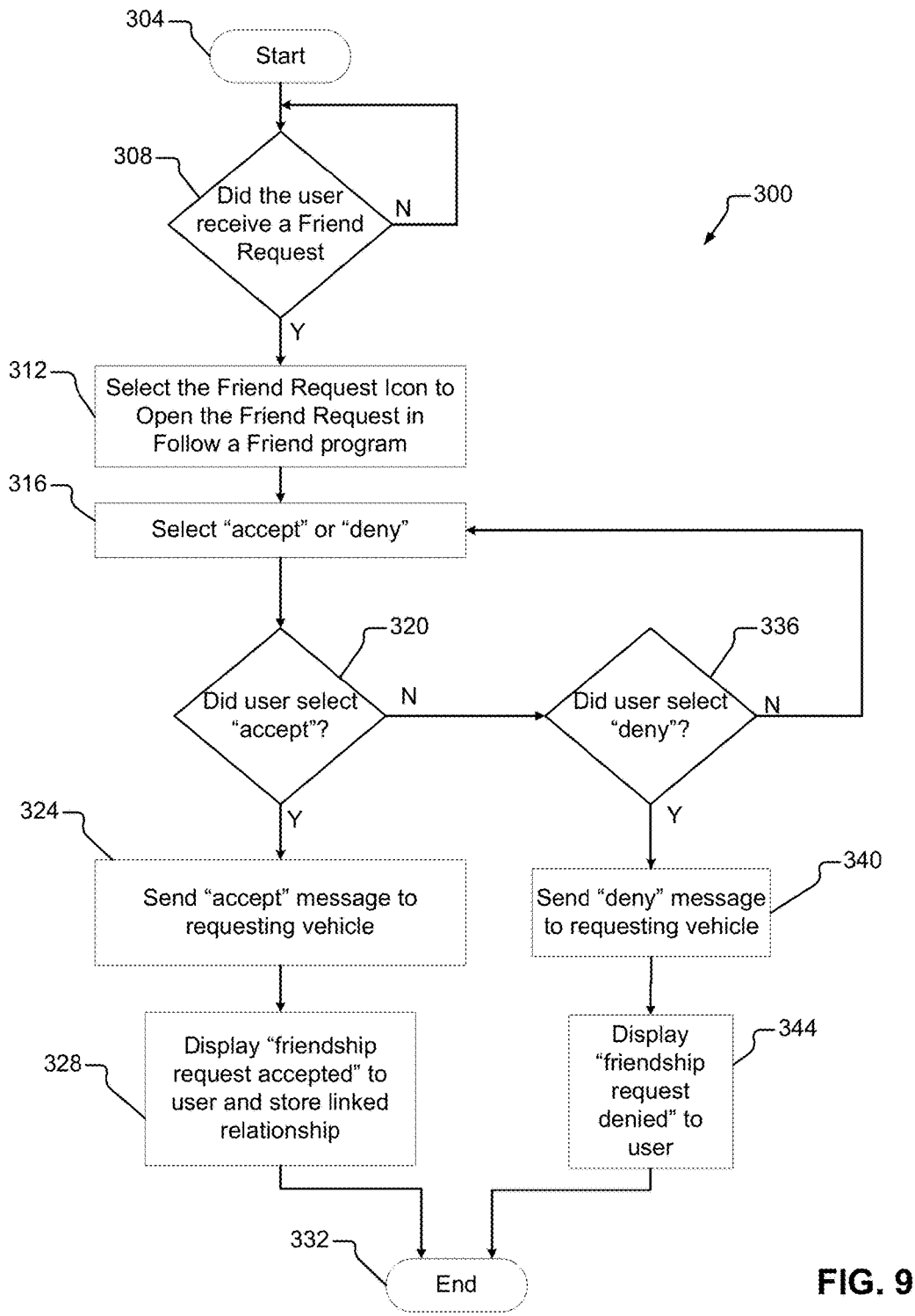

FIG. 9 is a flow chart for a method for receiving a link or request for friendship in the Follow a Friend system according to the present disclosure.

Figure 10:
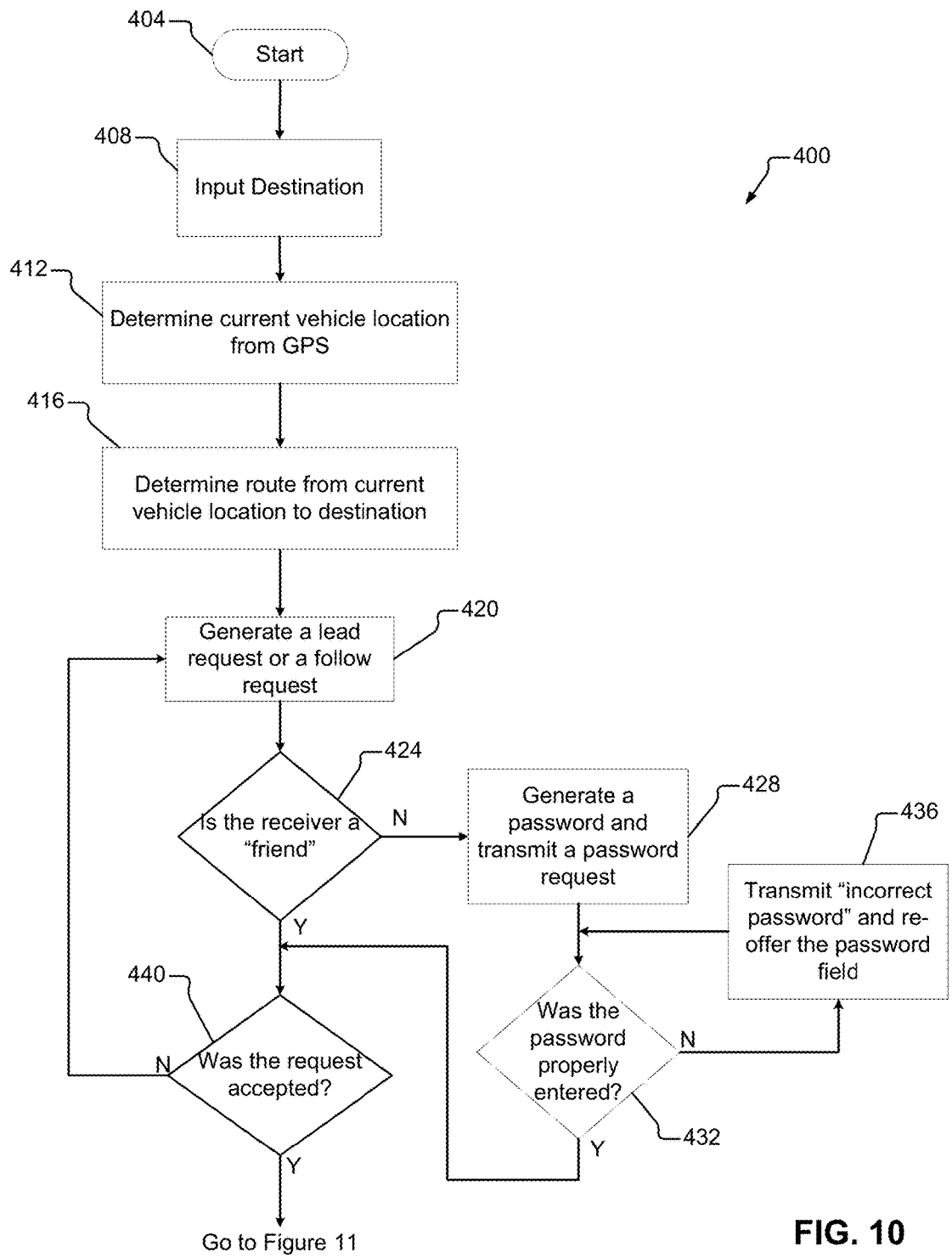

FIG. 10 is a flow chart for a method of using a Follow a Friend system according to the present disclosure.

Figure 11:
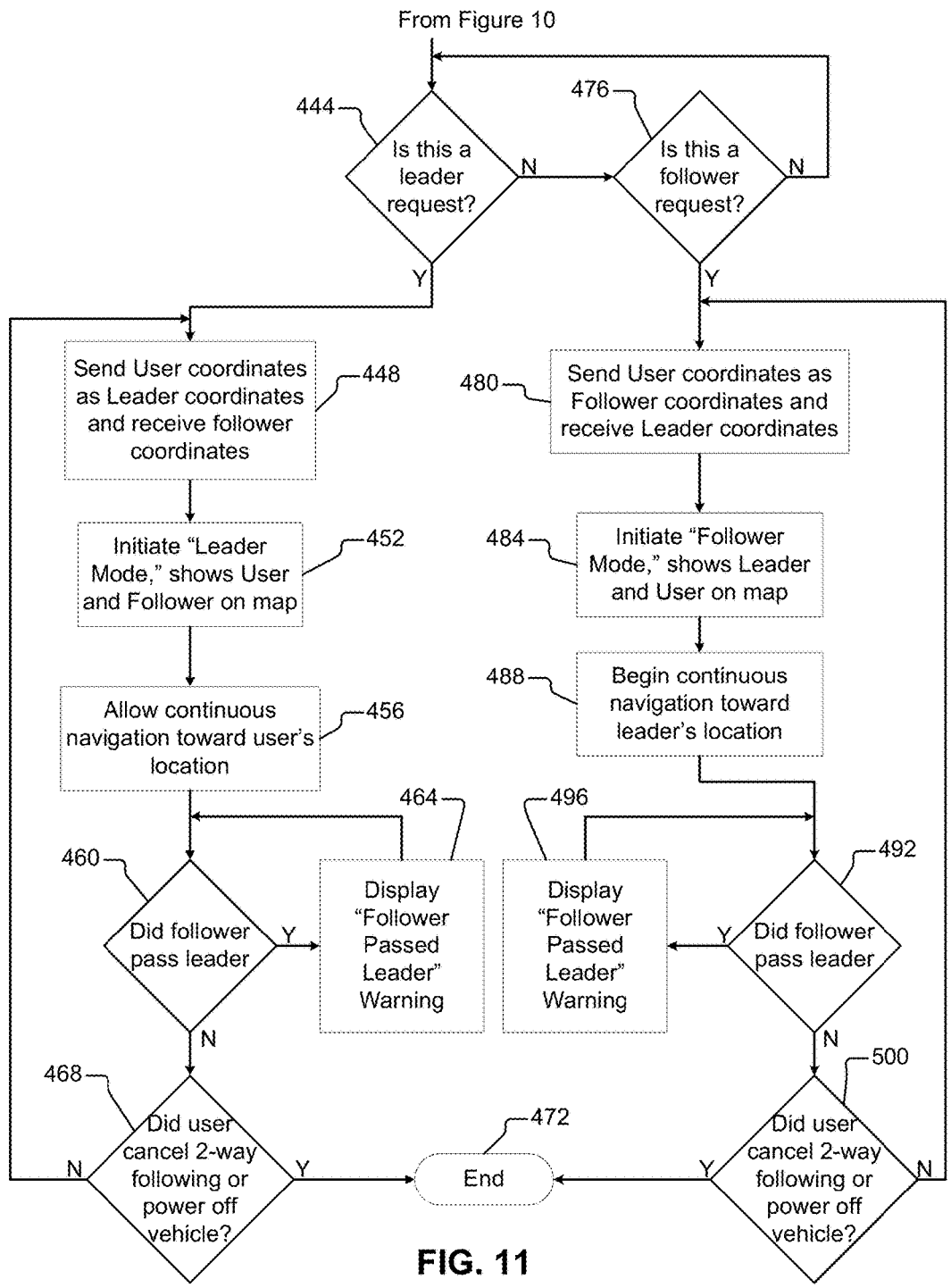

FIG. 11 is a continuation of FIG. 10.

Figure 12:
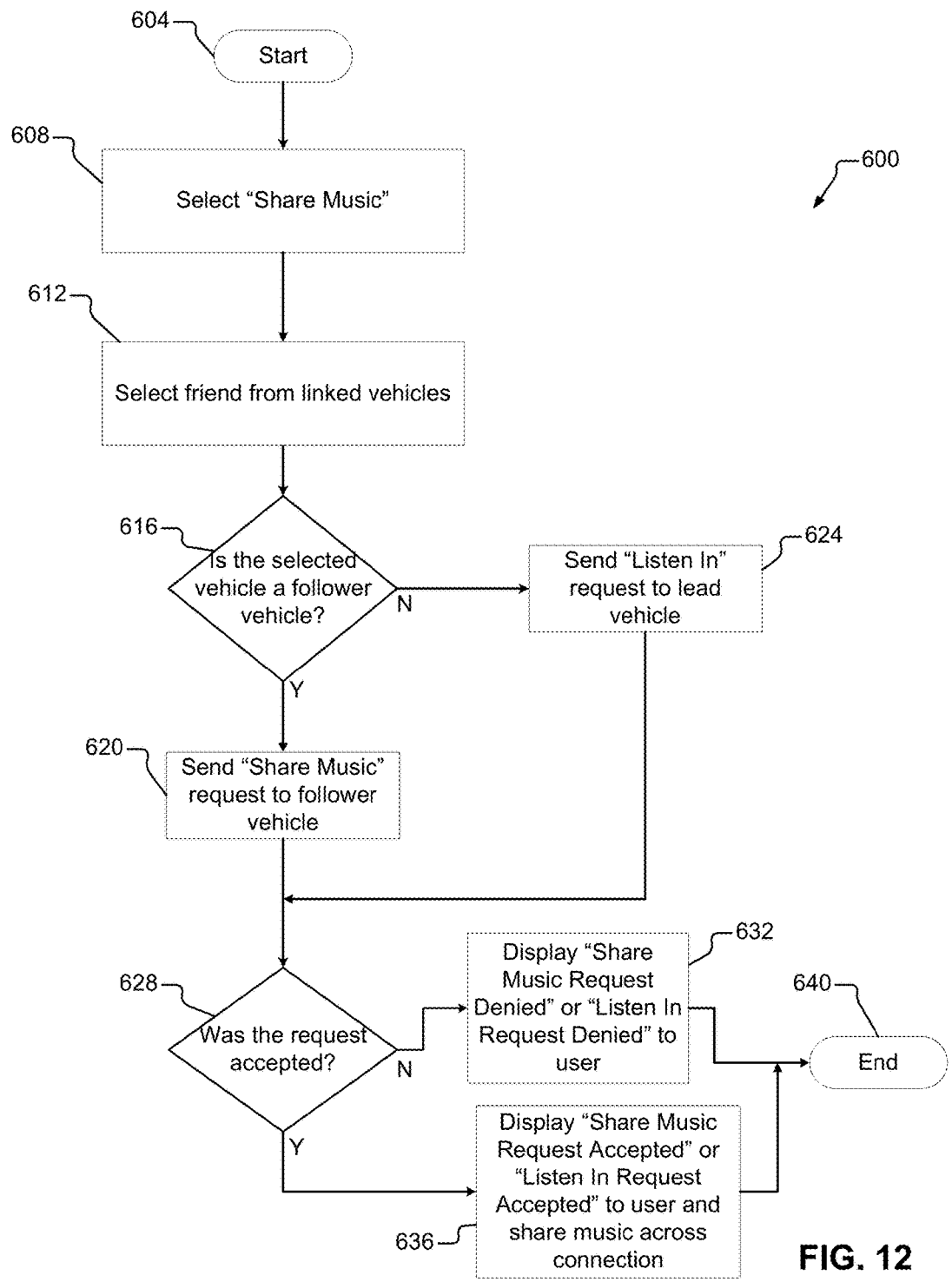

FIG. 12 is a flow chart for a method for sharing music for the Follow a Friend system according to the present disclosure.

Figure 13:
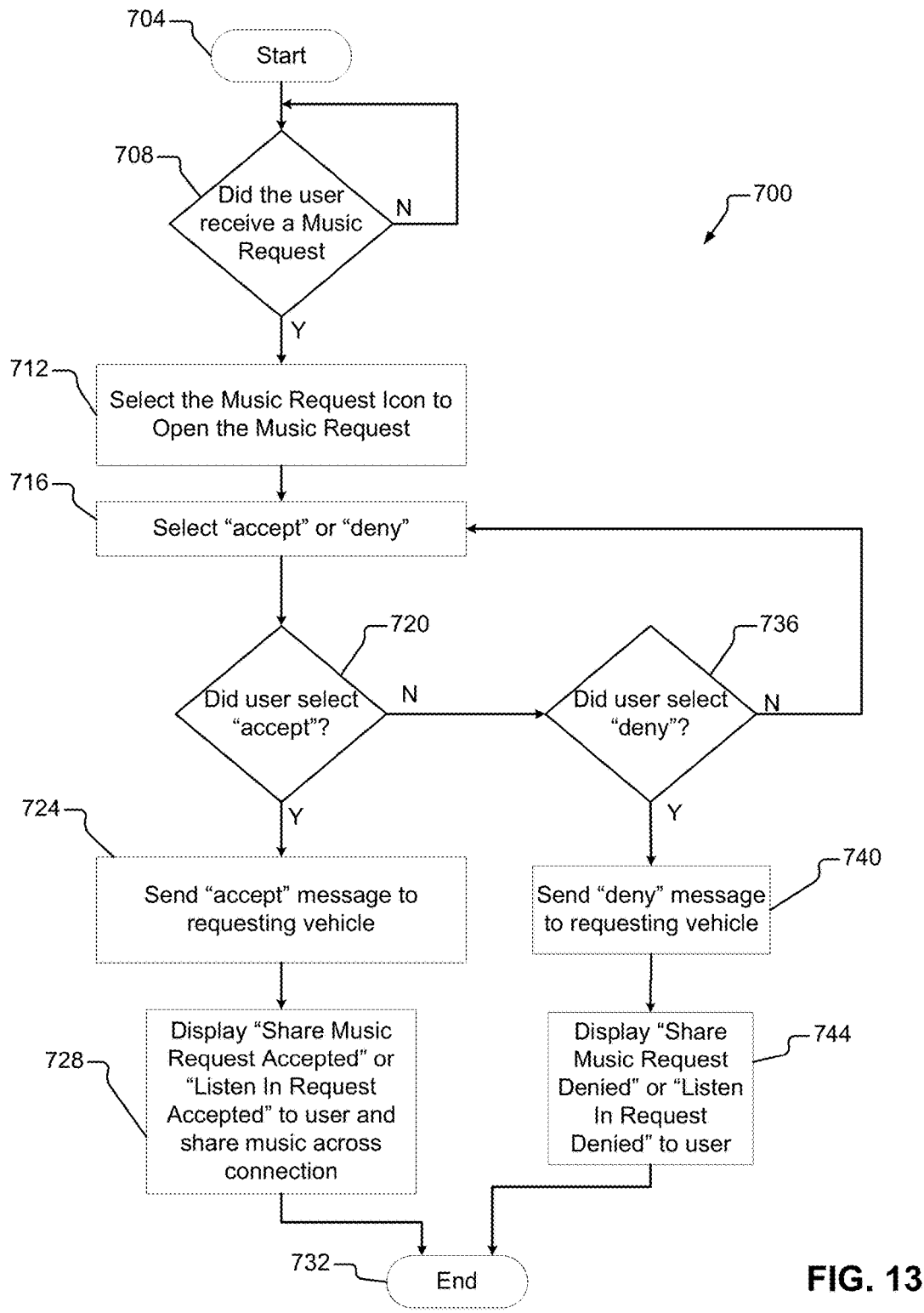

FIG. 13 is a flow chart for another method for sharing music for the Follow a Friend system according to the present disclosure.

Corresponding reference numerals indicate corresponding parts throughout the several views of the drawings.

DETAILED DESCRIPTION

Example embodiments will now be described more fully with reference to the accompanying drawings.

Figure 1:
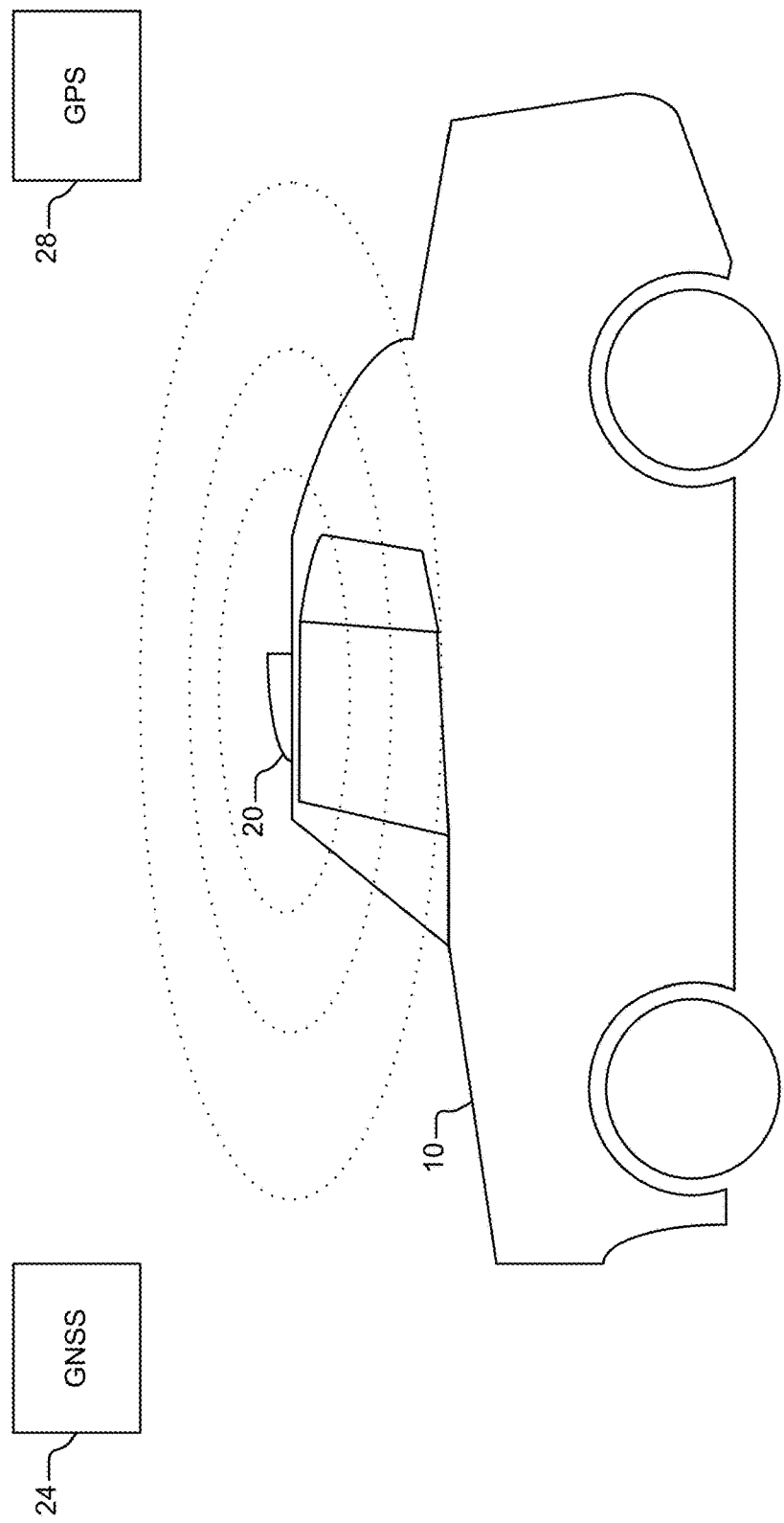
FIG. 1 is an illustration of a vehicle including a DSRC system and a navigation system equipped with a Follow a Friend system according to the present disclosure.

With reference to FIG. 1, a vehicle 10 having vehicle to vehicle (V2V) and vehicle to infrastructure (V2I), collectively referred to as V2X, safety technology is shown. In the example embodiment, a vehicle, or host vehicle, 10 is equipped with a dedicated short range communication (DSRC) system 20. The DSRC system 20 may be configured to transmit and receive signals to/from remote vehicles that are also equipped with V2X systems and/or to/from an infrastructure communication location equipped with a V2X system. The DSRC system 20 may receive information from Global Network Satellite Systems (GNSS) 24 and/or Global Positioning Systems (GPS) 28, which communicate with the DSRC system 20.

The DSRC system 20 may communicate with the other vehicles or infrastructure equipped with a V2X system by using a 75 MHz band around a 5.9 GHz signal. All of the components of the DSRC system 20 may be located at one or multiple locations on the roof of the vehicle. Alternatively, some of the components may be located in the interior of the vehicle 10. While the DSRC system 20 is illustrated as being located on the roof of the vehicle 10, in some embodiments, the DSRC system 20, and any or all of its components, may be disposed at any location on the vehicle 10 to include the front, rear, and sides of the vehicle 10.

Figure 2:
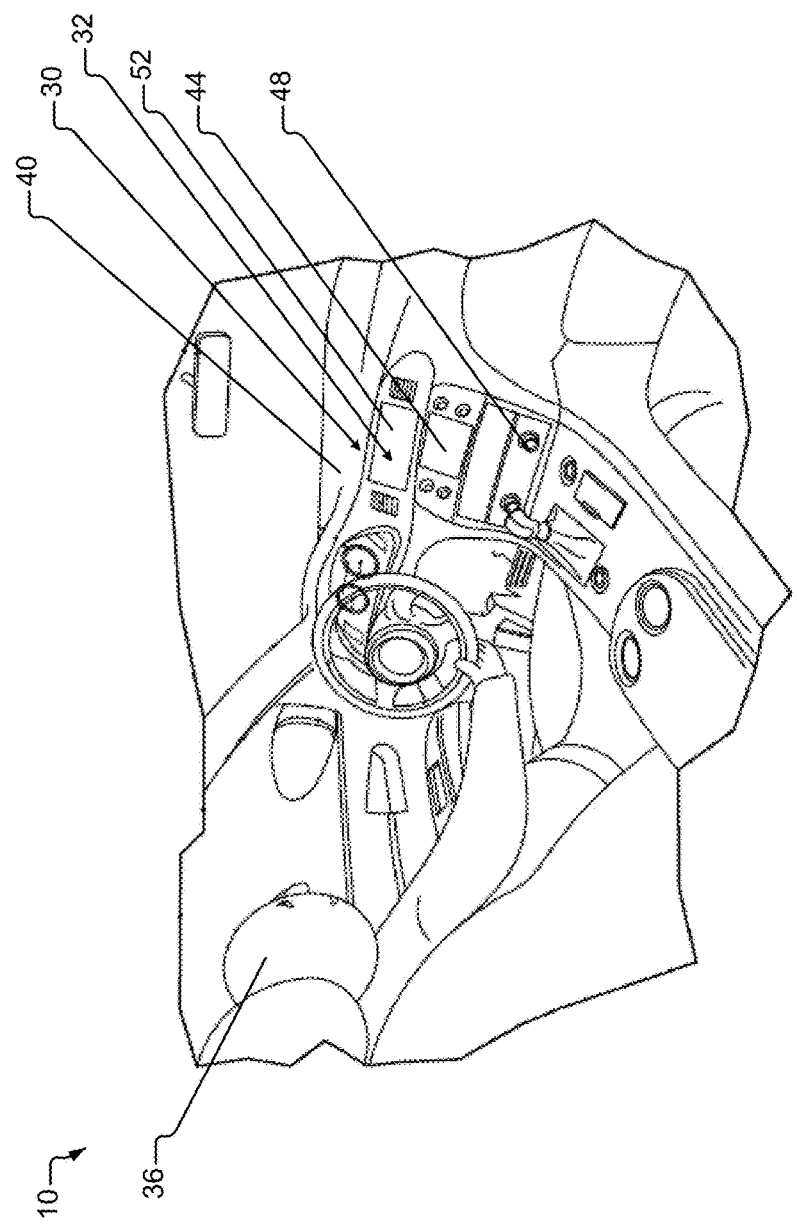
FIG. 2 is an illustration of an interior of the vehicle including the navigation system equipped with the Follow a Friend system according to the present disclosure.

The vehicle 10 may additionally include a navigation system 30 having a navigation device 32 (FIG. 2) and utilizing a Follow a Friend system according to the present disclosure. The navigation device 32 may communicate with the DSRC system 20 to obtain GPS or GNSS data for the vehicle 10. The navigation device 32 may be mounted in a vehicle interface, vehicle instrument panel, or human machine interface (HMI) of the vehicle to allow easy access by a driver 36 or passenger. In the illustrated example, the navigation device 32 is mounted in a dashboard 40 of the vehicle 10. While the navigation device 32 is illustrated as being separate from a radio 44 and comfort controls 48, it is understood that the navigation device 32 may also be incorporated with the radio, comfort controls, vehicle settings, etc. in a single HMI for the vehicle 10.

While portions of the discussion relate to a wired navigation device 32, it is understood that the navigation device 32 may utilize one or more wired or wireless links and one or more components of wireless communication. Some embodiments may utilize wired communication and/or wireless communication.

Additionally, while a navigation device 32 mounted in a vehicle 10 is described herein, it is understood that some embodiments may be used in conjunction with various devices and systems, for example only, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a Personal Navigation Device (PND), a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication device, a cellular telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry), a Wireless Application Protocol (WAP) device, or the like.

Figure 4:
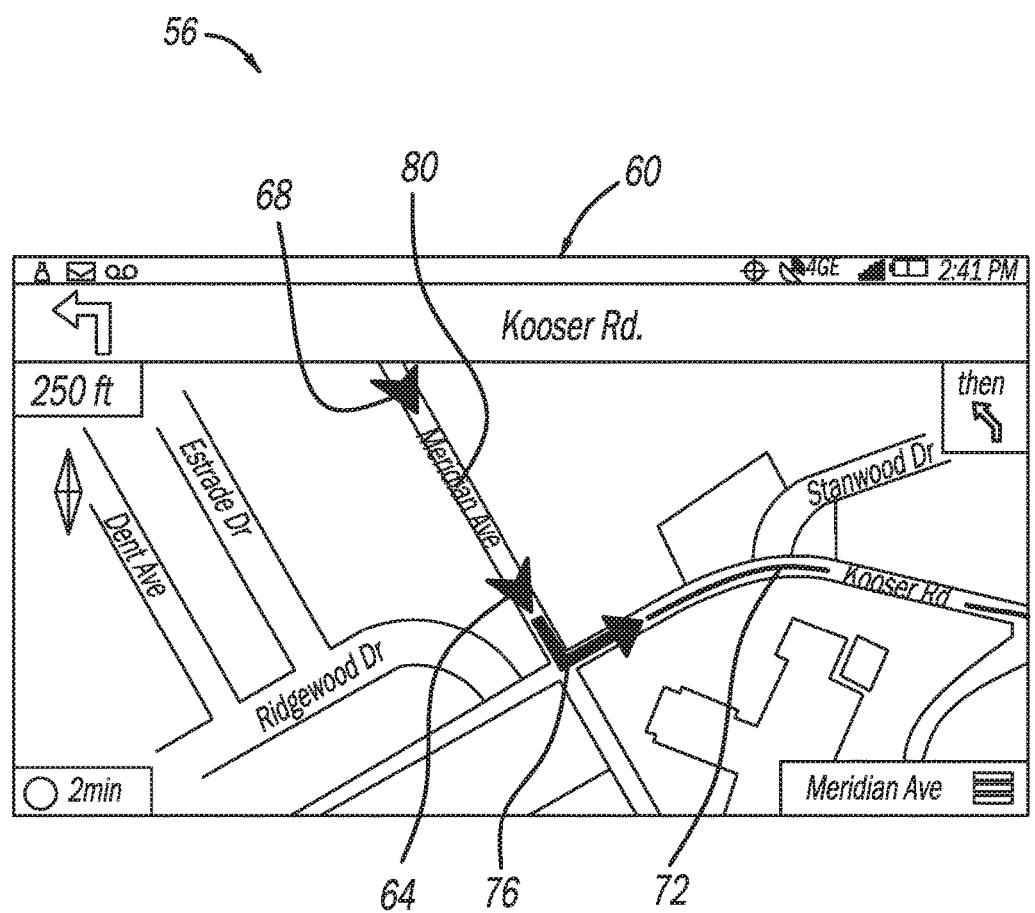
FIG. 4 is a screen shot of a navigation system equipped with a Follow a Friend system according to the present disclosure.

The navigation device 32 may include a display 52 that provides a location of the vehicle 10 (and sometimes one or more additional vehicles) on a map (see also FIGS. 4 and 6). The navigation device 32 may also provide an interface for entering a destination or utilizing a Follow a Friend system (described in detail below). Additionally, the navigation device 32 may provide visual and/or auditory instructions for driving, either following directions to the destination or following directions to a lead vehicle (further described below). Further, the navigation device 32 may include wireless technology for communicating with navigation systems and devices in other vehicles.

Figure 3:
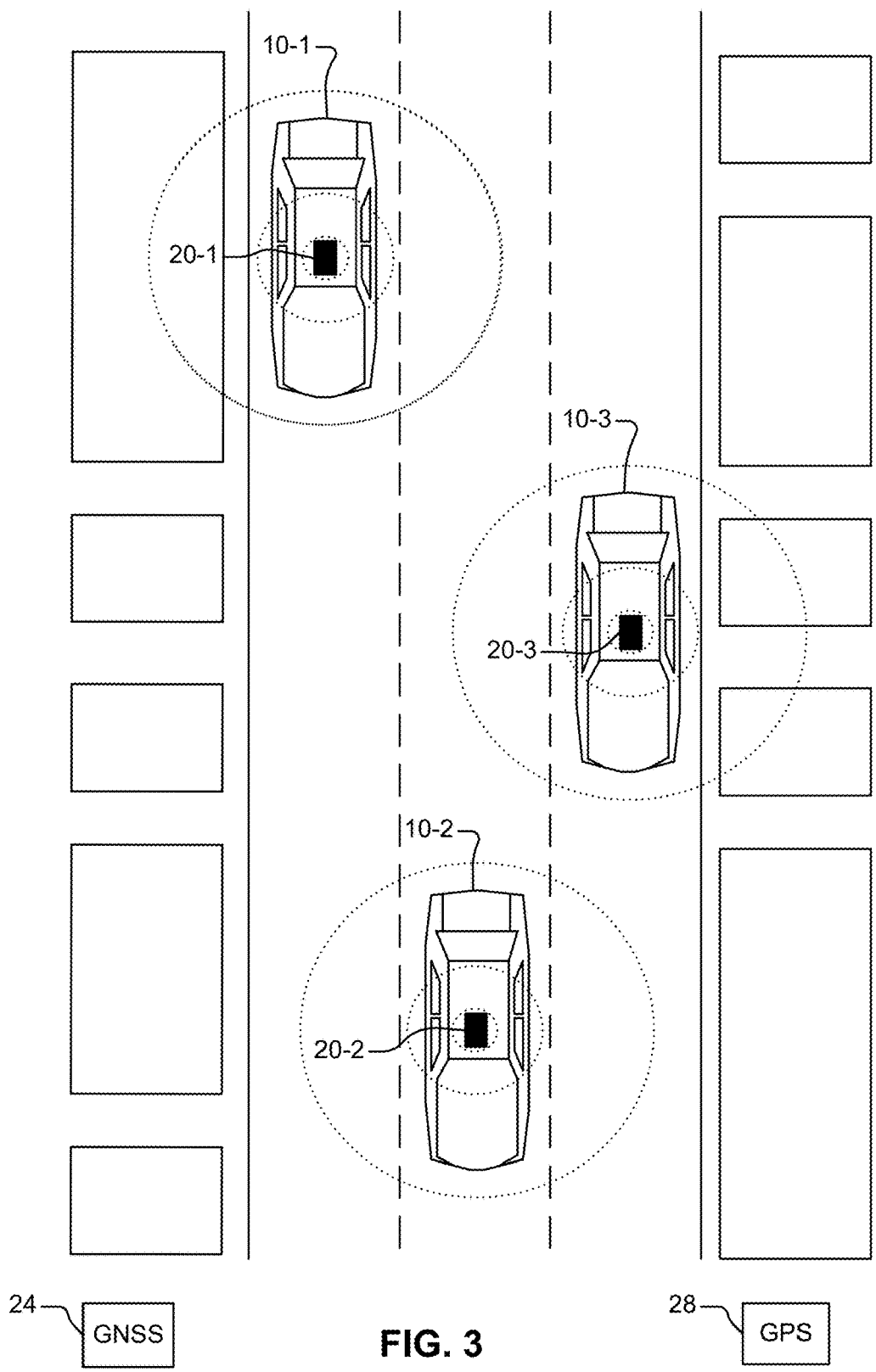
FIG. 3 is an illustration of several vehicles having DSRC and navigation systems.

With reference to FIG. 3, a plurality of vehicles and infrastructures with vehicle to vehicle (V2V) and vehicle to infrastructure (V2I), collectively referred to as V2X, technology is shown. V2X technology relies on vehicles transmitting messages over the DSRC radio to all other surrounding vehicles in the vicinity. In the example embodiment, vehicles, or remote vehicles, 10-1, 10-2, 10-3 (collectively referred to as vehicles 10) are respectively equipped with DSRC systems 20-1, 20-2, 20-3 (collectively referred to as DSRC systems 20. The DSRC systems 20 may operate in both line-of-sight (LOS) and non-line-of-sight (NLOS) conditions, thereby allowing the DSRC systems 20 of the vehicles 10 to communicate. DSRC signals from each of the DSRC systems 20 are illustrated radiating outward in a circular pattern, as indicated by dotted circles in FIG. 3.

Often, drivers of different vehicles are caravanning to the same location. For example, vehicles 10-1, 10-2, 10-3 in FIG. 3 may be caravanning to the same destination, with vehicle 10-2 following vehicle 10-1 and vehicle 10-3 following vehicle 10-2. It can sometimes be tricky, and dangerous, for one driver to follow another. It is easy for the follower to get separated from the leader by events such as other drivers cutting the follower off, traffic lights turning red during the following, or a leader that likes to drive faster than the follower. What often results is a follower driving recklessly to continue following the leader or a follower getting lost and/or needing to call or text the leader, which is also a safety concern during driving. Further, if the follower is not familiar with the area, or if the leader wants to stop and have the follower join him, there is a need to communicate easily with the follower.

As such, a Follow a Friend system 56 provides a means by which a leader and a follower are able to leverage the leader's knowledge of the location and directions and to always possess knowledge of the location of both the leader and the follower. More specifically, the Follow a Friend system 56 is directly built into the navigation system 30 of each vehicle 10 to visualize one vehicle 10-2 (for example) navigating toward another vehicle 10-1 (for example), while the vehicle 10-1 navigates toward the destination.

The Follow a Friend system 56 provides a Leader Mode and a Follower Mode. Both the leader's location and the follower's location are displayed on both the leader's navigation device 32-1 and the follower's navigation device 32-2 with indicators such as arrows (for example, of different colors to distinguish the leader from the follower). In addition the Follow a Friend system 56 accesses each vehicle's GPS system for position information and provides security to both the leader and the follower by requiring a "friendship" to be established before leading/following and/or by requiring a password to be entered to lead/follow. Thus, the Follow a Friend system 56 provides driver convenience and increased safety by providing the follower with directions to the leader such that the follower does not need to drive recklessly in order to keep up. Additionally, if the leader knows of a better route or would like to make an unplanned stop, the follower is simply routed to follow the leader without the leader and follower making unnecessary phone calls.

An example display 60 of the Follow a Friend system 56 is illustrated in FIG. 4. The Follow a Friend system 56 may exist as an application on a user's phone or mobile device, a program on a laptop or a navigation system, or in any other usable form. As shown in FIG. 4, the leader vehicle is indicated by a darker shaded arrow 64 and the follower vehicle is indicated by a lighter shaded arrow 68. The display 60 may appear the same in both the follower vehicle and the leader vehicle, but the directions provided may be different. In the leader vehicle, a route 72 from the leader vehicle's current location to a destination may be provided in bold on the map. Visual and/or auditory directions for driving to the destination may also be provided. For example, arrow 76 and/or a voice command may direct the leader to turn left in 250 ft. The display 60 also provides the location of the follower vehicle 68 to the lead vehicle.

In the follower vehicle, the display 60 may provide the route 72 from the lead vehicle's current location to the destination and a route 80 from the follower vehicle 68 to the lead vehicle 64. Visual and/or auditory directions for driving to the lead vehicle 64 may also be provided. For example, while the lead vehicle is provided with arrow 76 and/or the voice command to turn left in 250 ft, the follow vehicle 68 may be provided with directions to continue straight and move to the left lane to prepare for a left turn. If an additional turn separated the lead vehicle 64 from the follow vehicle 68, the follow vehicle would be provided with the route to the lead vehicle 64 instead of the route to the destination. In some embodiments, the display 60 may also provide the directions given to the lead vehicle 64 and the details of upcoming moves that the lead vehicle 64 has already taken.

Figure 5A:
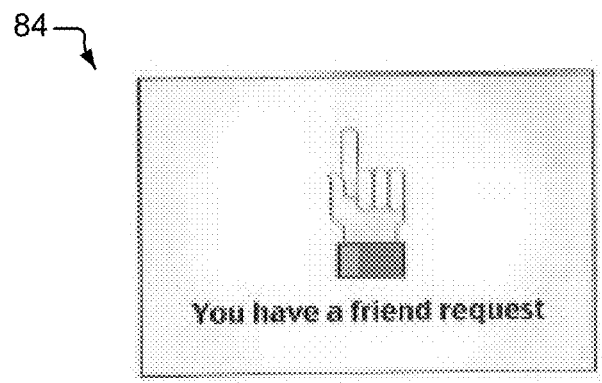
FIG. 5a is an example friend request notification for the Follow a Friend system according to the present disclosure.

With reference to FIG. 5a, before permitting a following or leading relationship, the Follow a Friend system 56 may require a "friendship" or preexisting linked relationship between the lead vehicle 64 or person and the follow vehicle 68 or person. The "friendship" may be established by, sometime prior to requesting a leading or following relationship, sending a "friend request" or link request from either the lead vehicle 64 or person to the follow vehicle 68 or person or from the follow vehicle 68 or person to the lead vehicle 64 or person.

The user (either the lead vehicle 64 or person or the follow vehicle 68 or person) may open the Follow a Friend application or program and select a "friend request" or "link request" mode or feature. The user inputs identifying information, such as a vehicle identification number (VIN), an email address, a name and telephone number, or other identifying information into a search field or selects an entry from a list of contacts for a desired friend or link. Once the desired friend or link is located, the user may prompt the Follow a Friend program to send a friend request or link request. The desired friend or link may receive a notification 84, such as the notification 84 in FIG. 5a, of the friend request or request to link. The desired friend or link can open the notification 84 and respond by either accepting or denying the request. Once the desired friend or link responds to the request, the Follow a Friend program reports the status to the user.

After establishing a friendship or linked connection or relationship, the leading or following relationship may be established between the lead vehicle and the follow vehicle. To establish the leading or following relationship, the user (the lead vehicle or the follow vehicle) may open the Follow a Friend application or program and select a "leading" mode or feature or a "following" mode or feature. The user selects the desired leader/follower from a list of linked vehicles. The user then prompts the Follow a Friend program to send either a "lead me" request or a "follow me" request to the selected desired follower. An example of a "follow me" request is provided in FIG. 5b.

Figure 5B:
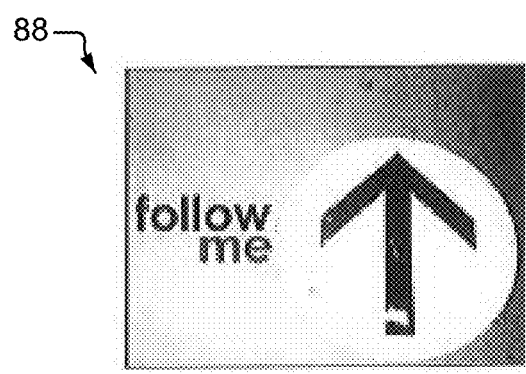
FIG. 5b is an example follow me request notification for the Follow a Friend system according to the present disclosure.

The desired leader/follower may receive a notification 88, such as the notification 88 in FIG. 5b, of the request to lead or follow. The desired leader/follower can open the notification 88 and respond by either accepting or denying the request. Once the desired friend or link responds to the request, the Follow a Friend program may report the status to the user.

In alternative to or in addition to establishing a friendship or linked connection or relationship prior to establishing the following or leading relationship, the lead vehicle and/or the follow vehicle may implement a password protection that may be sent with the lead or follow request. At startup, the user (the lead vehicle or the follow vehicle) opens the Follow a Friend application or program and selects a "leading" mode or feature or a "following" mode or feature. The user selects the desired leader/follower either from a list of linked vehicles or by entering identifying information, such as a vehicle identification number (VIN), an email address, a name and telephone number, or other identifying information into a search field or selects an entry from a list of contacts for a desired friend or link. The user then prompts the Follow a Friend program to send either a "lead me" request or a "follow me" request to the selected desired follower. Before sending the "lead me" request or a "follow me" request, the user is prompted to enter a password to be requested by the desired leader/follower.

Figure 5C:
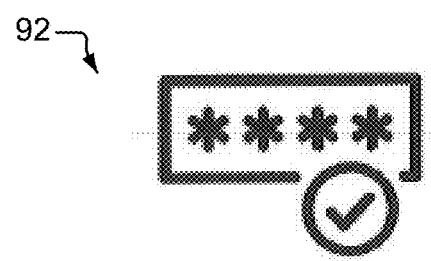
FIG. 5c is an example password notification for the Follow a Friend system according to the present disclosure.

The desired leader/follower may receive a notification 88, such as the notification 88 in FIG. 5b, of the request to lead or follow. The desired leader/follower can open the notification 88. The desired leader/follower may then be prompted to enter the password selected by the user. Once the desired leader/follower inputs the correct password, a correct password icon 92 may appear. An example of the correct password icon 92 is illustrated in FIG. 5c. The desired leader/follower may then respond by either accepting or denying the request, as previously described.

With reference to FIG. 6, once a leading or following relationship is established, the locations of the lead vehicle and the follow vehicle(s), along with the destination, where applicable, are displayed on a map on the navigation device. FIG. 6 illustrates a screen shot of the navigation system 30 utilizing the Follow a Friend system 56. An arrow 96 (or other icon) indicates the lead vehicle, arrows 100 and 104 (or other icons—the same or different) indicate two follower vehicles, and the arrow 108 indicates a follower vehicle that has passed the lead vehicle.

As previously stated, a display 112 may appear the same in both the follower vehicle(s) and the leader vehicle, but the directions provided may be entirely different. For example, in a leader vehicle, a "Follow Mode: Leader" mode may be run. If a destination has been entered, a route 116 from the leader vehicle's current location to the destination may be provided in bold on the map. Visual and/or auditory directions for driving to the destination may also be provided. For example, arrow 120 and/or a voice command may direct the leader to turn left in 250 ft. The display 112 also provides the location of each of the follower vehicles 100, 104, 108 to the lead vehicle.

While a route 116 from the lead vehicle 96 to a destination is illustrated in FIG. 6, it is not necessary for the lead vehicle to input a destination into the Follow a Friend system 56. For example, the links between the lead vehicle and the follower vehicles may be maintained, and the follower vehicles may simply rely on the knowledge of the directions or area of the lead vehicle without inputting a destination. In this case, there would be no visual and/or auditory commands to direct the lead vehicle of upcoming directions. However, the locations and routes of the follower vehicles would still be illustrated on the map on the lead vehicle's navigation system 30.

In the follower vehicles, a "Follow Mode: Follower" mode may be run. The display 112 may provide the route 116 from the lead vehicle's current location 96 to the destination and a route from the follower vehicle 100 to the lead vehicle 96, a route from the follower vehicle 104 to the lead vehicle 96, and a route from the follower vehicle 108 to the lead vehicle 96. For example, in the example of FIG. 6, because the directions provided to the follower vehicle are for a destination of the leader vehicle, the directions provided to the follower vehicle 100 will be different from the directions provided to the follower vehicle 104, and the directions provided to the follower vehicles 100 and 104 will be different from the directions provided to the follower vehicle 108. Visual and/or auditory directions for driving to the lead vehicle 96 may also be provided for each vehicle. In some embodiments, the display 60 may also provide the directions given to the lead vehicle 96 and the details of upcoming moves that the lead vehicle 96 has already taken.

In examples such as the one above, when a follower vehicle, such as follower vehicle 108, passes a lead vehicle, such as lead vehicle 96, a warning message indicating that the follower vehicle passed the leader may be displayed in one or both of the follower vehicle and the lead vehicle. Additionally, directions (visual and/or auditory) may be provided to the follower vehicle to return the follower to a following position. In some embodiments, an option to switch leading/following positions may be provided to the leader and follower when the follower passes the leader. This additional functionality allows the leader to defer to the follower's knowledge of the area and/or the follower's need to make an unplanned stop without requiring the follower to otherwise contact the leader.

In some embodiments, vehicles 96 and 108 may be lead vehicles, and vehicles 96, 100, and 104 may be follower vehicles. For example, vehicle 108 may be a lead vehicle and vehicle 96 may be a follower vehicle to lead vehicle 108 and a lead vehicle to follower vehicles 100 and 104. Thus, it is possible for a vehicle to be both a lead vehicle and a follower vehicle.

The lead and follow vehicles may be arranged in one of the following ways: (1) a single leader with one or more followers; (2) daisy-chained such that vehicles are both leaders and followers; and (3) a combination thereof. An example of (1) is provided in the description of FIG. 6, above, where vehicle 96 is the leader and vehicles 100, 104, and 108 are followers. An example of (2) is where vehicle 108 is a leader, vehicle 96 follows vehicle 108 but is also a leader, vehicle 100 follows vehicle 96 but is also a leader, and vehicle 104 follows vehicle 100. An example of (3) is also provided in the description of FIG. 6, above, where vehicles 96 and 108 are leaders and vehicles 96, 100, and 104 are followers.

In the arrangement of (1) above, the "Follow Mode" would be entered by either (a) the lead vehicle 96 sending "Follow Me" requests to vehicles 100, 104, and 108, (b) each of vehicles 100, 104, and 108 sending "Lead Me" requests to vehicle 96, or (c) a combination thereof. For example, in relation to (c), vehicle 100 may send a "Lead Me" request to vehicle 96, and vehicle 96, after accepting the "Lead Me" request, may send "Follow Me" requests to the remaining vehicles 104 and 108.

In the arrangement of (2) above, the "Follow Mode" would be entered by either (a) the lead vehicles 108, 96, and 100 sending "Follow Me" requests to vehicles 96, 100, and 104, respectively, (b) each of vehicles 96, 100, and 104 sending "Lead Me" requests to vehicles 108, 96, and 100, respectively, or (c) a combination thereof.

In the arrangement of (3) above, the "Follow Mode" would be entered by either (a) the lead vehicles 108 and 96 sending "Follow Me" requests to vehicles 96, 100, and 104, (b) each of vehicles 96, 100, and 104 sending "Lead Me" requests to vehicles 108 and 96, or (c) a combination thereof.

In some embodiments, bidirectional music sharing may occur between the lead vehicle and one or more follower vehicles. During the "Follow Mode," 2-way communication of GPS coordinates occurs, so the already in-place connection between the vehicles may be taken advantage of to share music between the vehicles. Similar to a follow request, a "Share Music" request may be sent from the leader to the follower. If the follower confirms, occupants in both vehicles will hear the music that the lead vehicle is playing. In the case of more than one following vehicle, all vehicles may listen to the leader vehicle's music. Similar to a "Share music" request, a "Listen In" request may be sent from the follower to the leader to listen to the follower's music. If the leader confirms, occupants in both the leader vehicle and the follower vehicle will hear the music that the follower vehicle is playing.

The Follow a Friend system 56 works well in manual driving and also scales to Autonomous Driving. During autonomous driving, a driver may follow the steps on the navigation display to allow leading or following of a friend. After linking through the "Lead Me" or "Follow Me" request, the follower vehicle will communicate with the lead vehicle to execute the directions autonomously. The driver may select a preferred following distance (for example, 50 feet) for following during autonomous driving mode. Driver stress may be reduced as the vehicle follows the path to the destination (either the lead vehicle or the input destination). The users can relax and trust that the vehicles are leading and/or following. The follower may further choose a setting for preferred following distance with in autonomous driving mode.

Now referring to FIG. 7, a block diagram for the navigation system 30 including the Follow a Friend system 56 is illustrated. The Follow a Friend system 56 may include a navigation unit 124, a position unit 128, a communication unit 132, and a display unit 136. The navigation system 30 and the Follow a Friend system 56 may communicate with the GPS/GNSS 28/24 and one or more remote vehicles 10-1, 10-2, . . . , 10-n.

The communication unit 132 may communicate with the user (through the display unit 136) and one or more of the remote vehicles 10-1, 10-2, . . . , 10-n to establish friendships or links between the vehicles. For example, the communication unit 132 may provide the vehicle's contact list to the user for selecting a friend with which to link. The communication unit 132 may also receive vehicle identification information from the user for one or more of the remote vehicles 10-1, 10-2, . . . , 10-n. When the user prompts the Follow a Friend system 56 to send a friendship or link request, the communication unit 132 transmits this request to an identified remote vehicle 10-1, 10-2, . . . , 10-n. When the remote vehicle 10-1, 10-2, . . . , 10-n accepts or rejects the friendship or link request, the communication unit 132 receives the response and displays either a "friendship request denied" or "friendship request accepted" message to the user. Further, if the friendship request or link is accepted, the communication unit 132 stores the linked relationship in the Follow a Friend system 56.

The communication unit 132 may further communicate with the user and one or more of the remote vehicles 10-1, 10-2, . . . , 10-n to accept friendship or link requests between the vehicles. For example, the communication unit 132 may receive the friendship or link request transmitted from one or more of the remote vehicles 10-1, 10-2, . . . , 10-n and communicate with the user to prompt the user to accept or deny the friendship or link request. The communication unit 132 then transmits an accept or deny message to the one or more of the remote vehicles 10-1, 10-2, . . . , 10-n. If the user accepts the friendship or link request, the communication unit 132 stores the linked relationship in the Follow a Friend system 56.

In addition to transmitting and receiving messages from one or more remote vehicles 10-1, 10-2, . . . , 10-n regarding friendship or link requests, the communication unit 132 may communicate with one or more of the remote vehicles 10-1, 10-2, . . . , 10-n to provide a current location for the vehicle 10, to receive current locations or coordinates for the remote vehicles 10-1, 10-2, . . . , 10-n, to send and receive lead requests and/or follow requests, to send and receive "share music" and "listen in" requests, to transmit music, to send and receive/verify passwords, and/or to perform any other communication function between the Follow a Friend system 56 of the vehicle 10 and the one or more of the remote vehicles 10-1, 10-2, . . . , 10-n.

The communication unit 132 may communicate or transmit messages to the one or more of the remote vehicles 10-1, 10-2, . . . , 10-n either over a wireless connection between the navigation system 30 of the vehicle 10 and the navigation systems of the one or more of the remote vehicles 10-1, 10-2, . . . , 10-n, or the communication unit 132 may communicate or transmit messages to the one or more of the remote vehicles 10-1, 10-2, . . . , 10-n through the DSRC systems 20 of the vehicle 10 and the one or more of the remote vehicles 10-1, 10-2, . . . , 10-n (i.e., through V2V communication). Additionally, while these methods are discussed herein, any communication between the navigation system 30 and/or vehicle 10 and the navigation systems and/or one or more of the remote vehicles 10-1, 10-2, . . . , 10-n is acceptable to communicate or transmit messages between the vehicle 10 and the remote vehicles 10-1, 10-2, . . . , 10-n.

The position unit 128 may communicate with the GPS/GNSS 28/24 to obtain the coordinates of the vehicle 10. The position unit 128 may also communicate with the communication unit 132 to obtain the coordinates of any remote vehicles 10-1, 10-2, . . . , 10-n. The position unit 128 may communicate the coordinates of the vehicle 10 and the remote vehicles 10-1, 10-2, . . . , 10-n to the navigation unit 124.

The navigation unit 124 may receive the coordinates of the vehicle 10 and the remote vehicles 10-1, 10-2, . . . , 10-n from the position unit 128 and may display them on a map for the user. The navigation unit 124 may have stored maps in memory. The navigation unit 124 may provide a map to the display unit 136 for display on the navigation system 30. The navigation unit 124 may plot (and continuously update) the coordinates of the vehicle 10 and the remote vehicles 10-1, 10-2, . . . , 10-n. Additionally, the navigation unit 124 may receive location information (such as coordinates, an address, or the like) for a destination (either a fixed destination or a lead vehicle) and may plot the destination on the map.

If the destination is a fixed destination, the navigation unit 124 may plot a route from the vehicle 10 to the fixed destination and may provide directions, visual and/or audible, to the user. If the destination is a lead vehicle, as previously described, the navigation unit 124 may continuously update the destination, i.e. the coordinates of the lead vehicle, and the route thereto, and may provide directions, visual and/or audible, to the user.

The display unit 136 may communicate with the communication unit 132 and the navigation unit 124 to provide an interface for the user. The display unit 136 may display messages to the user and prompt the user to accept or deny various requests, as previously described. Further, the display unit 136 may display the map, the locations of the vehicle 10 and the remote vehicles 10-1, 10-2, ..., 10-n, the various destinations, the route, and the visual directions.

Now referring to FIG. 8, a method 200 for requesting to link or establish a friendship in the Follow a Friend system 56 is illustrated. Method 200 starts at 204. At 208, a user opens the Follow a Friend system. The Follow a Friend system 56 may be selected in the navigation system 30 or may be started when the vehicle 10 is powered on or started.

At 212, the user selects "Friend Request" from a list of options on the Follow a Friend system 56 display. Among the list of options may be, for example only, "Friend Request," "Destination," "Lead Request," "Follow Request," "Share Music," and "Listen In."

At 216, the Follow a Friend system 56 determines whether the desired friend is in the vehicle's contact list. The Follow a Friend system 56 may maintain a contact list of vehicles or users input by the user. For example, the contact list may be imported from a user's phone, email, or other application or device. If the desired friend is in the vehicle's contact list at 216, the user selects the friend from the contact list at 220. If the desired friend is not in the vehicle's contact list at 216, the Follow a Friend system 56 prompts the user to enter or input identifying information at 224. For example, the identifying information may be a vehicle identification number (VIN), an email address, a name and telephone number, or other identifying information for a desired friend or link.

Regardless of whether the friend is selected from a contact list at 220, or whether identifying information is input at 224, the Follow a Friend system 56 generates and transmits a friendship request (or link request) to the desired friend at 228. The request may be communicated or transmitted to the desired friend over a wireless connection, through V2V communication, or by any other communication means.

At 232, the Follow a Friend system 56 determines whether the request was accepted. The Follow a Friend system 56 will receive a transmission back from the desired friend with either an acceptance message or a denial message. If the request is denied, the Follow a Friend system 56 displays a "friendship request denied" message to the user at 236. If the request is accepted at 232, the Follow a Friend system 56 displays a "friendship request accepted" message to the user and stores the linked friendship at 240. The method 200 then ends at 244.

Now referring to FIG. 9, a method 300 for receiving a link or request for friendship in the Follow a Friend system 56 is illustrated. The method 300 begins at 304. At 308 the Follow a Friend system 56 determines whether the user has received a Friend Request. If the user has not received a Friend Request, the method 300 continues monitoring for a Friend Request and returns to 308.

If the user has received a Friend Request at 308, the user selects the Friend Request icon to open the Friend Request in the Follow a Friend program at 312. At 316, the Follow a Friend system 56 prompts the user to select "accept" or "deny" in response to the Friend Request. At 320, the Follow a Friend system 56 determines whether the user selected "accept."

If the user selected "accept," the Follow a Friend system 56 sends an "accept" message to the requesting vehicle at 324. The message may be communicated or transmitted to the requesting vehicle over a wireless connection, through V2V communication, or by any other communication means.

At 328, the Follow a Friend system 56 displays "friendship request accepted" to the user and stores the linked relationship. The method then ends at 332.

If the user did not select "accept" at 320, the Follow a Friend system 56 determines whether the user selected "deny" at 336. If the user did not select "deny," the Follow a Friend system 56 prompts the user to select "accept" or "deny" at 316. If the user did select "deny" at 336, the Follow a Friend system 56 sends a "deny" message to the requesting vehicle at 340. The message may be communicated or transmitted to the requesting vehicle over a wireless connection, through V2V communication, or by any other communication means.

At 344, the Follow a Friend system 56 displays "friendship request denied" to the user. The method then ends at 332.

Now referring to FIGS. 10-11, a method 400 for using the Follow a Friend system 56 is illustrated. The method 400 begins at 404 (FIG. 10). At 408, the user may input a destination into the Follow a Friend system 56. At 412, the Follow a Friend system 56 determines the current vehicle location for the vehicle (and user) and displays both the location information for the vehicle 10 and the destination on the map. At 416, the Follow a Friend system 56 may determine a route from the current location of the vehicle 10 to the provided destination. The Follow a Friend system may also display the route on the map.

While steps 408-416 are provided in FIG. 10, these steps are not necessary for the functionality of the Follow a Friend system 56. As previously stated, it is not necessary for the lead vehicle (or any follow vehicle) to input a destination into the Follow a Friend system 56. For example, the links between the lead vehicle and the follower vehicles may be maintained, and the follower vehicles may simply rely on the knowledge of the directions or area of the lead vehicle without inputting a destination. In this case, there would be no visual and/or auditory commands to direct the lead vehicle of upcoming directions. However, the locations and routes of the follower vehicles would still be illustrated on the map on the lead vehicle's navigation system 30.

At 420, the Follow a Friend system 56 generates a lead request or a follow request as prompted by the user. At 424, the Follow a Friend system 56 determines wither the desired receiver is a "friend" or linked vehicle. As previously stated in accordance with FIGS. 8 and 9, a friendship or link may be established between two vehicles before any follow or lead request is sent. The requirement for a friendship or link to be established is an added security measure that prevents unwanted follow or lead requests. In addition, or in the alternative to the friendship or link, a password system may be used.

If, at 424, the receiver is not a "friend" or link (or in addition to the receiver being a "friend" or link), the Follow a Friend system 56 may generate a password at 428 and transmit a password request to the desired "friend" or link. The password request may be communicated or transmitted to the requesting vehicle over a wireless connection, through V2V communication, or by any other communication means.

At 432, the Follow a Friend system 56 receives the entry from the desired "friend" or link and determines whether the password was entered properly. If the password is incorrect, the Follow a Friend system 56 transmits an "incorrect password" message and reoffers the password-entry field to the desired "friend" or link at 436. The method 400 then returns to 432.

If the password is correct at 432 or if the receiver is a "friend" at 424, the Follow a Friend system 56 receives a response to the lead request or follow request from the linked vehicle at 440. The Follow a Friend system 56 also determines whether the lead request or follow request is accepted by the linked vehicle at 440. If the lead request or follow request is denied, the method 400 returns to 420 and prompts the user to generate a lead request or follow request.

If the lead request or follow request is accepted at 440, the method 400 determines if the request was a leader request at 444 (FIG. 11). If the request is was a leader request, the Follow a Friend system 56 transmits the coordinates of the vehicle 10 and receives the coordinates of the follower vehicle(s) (i.e., one or more remote vehicles 10-1, 10-2, . . . , 10-n). The coordinates may be communicated or transmitted to the Follow a Friend system 56 over a wireless connection, through V2V communication, or by any other communication means.

At 452, the Follow a Friend system 56 initiates "Leader Mode" and provides icons for the vehicle 10 and the follower vehicle(s) (i.e., one or more remote vehicles 10-1, 10-2, . . . , 10-n) on the map. If previously entered at 408-416, the Follow a Friend system 56 also provides visual and/or auditory directions to the destination.

At 456, the Follow a Friend system 56 allows continuous navigation toward the vehicle's 10 location. The Follow a Friend system 56 continuously transmits the coordinates of the vehicle 10 to the follower vehicle(s) (i.e., one or more remote vehicles 10-1, 10-2, . . . , 10-n).

At 460, the Follow a Friend system 56 determines whether one or more of the follower vehicle(s) (i.e., remote vehicles 10-1, 10-2, . . . , 10-n) has passed the vehicle 10. The Follow a Friend system 56 continuously receives location coordinates for each of the follower vehicle(s) (i.e., one or more remote vehicles 10-1, 10-2, . . . , 10-n). Thus, the Follow a Friend system 56 is able to continuously update the map with the location of the follower vehicle(s) (i.e., one or more remote vehicles 10-1, 10-2, . . . , 10-n). If the updated map shows one or more of the follower vehicle(s) (i.e., one or more remote vehicles 10-1, 10-2, . . . , 10-n) ahead of the vehicle 10, the Follow a Friend system 56 is able to identify that the follower vehicle(s) (i.e., one or more remote vehicles 10-1, 10-2, . . . , 10-n) has passed the vehicle 10.

If one or more of the follower vehicle(s) (i.e., remote vehicles 10-1, 10-2, . . . , 10-n) has passed the vehicle 10, the Follow a Friend system 56 displays a "Follower Passed Leader" warning to the user at 464. If one or more of the follower vehicle(s) (i.e., remote vehicles 10-1, 10-2, . . . , 10-n) has not passed the vehicle 10, the Follow a Friend system 56 determines whether the user has cancelled the two-way following or powered off the vehicle 10 at 468.

The user may cancel the two-way following by selecting a "cancel" icon in the Follow a Friend system 56 or by powering off the vehicle 10. If the user has cancelled the two-way following, the method 400 ends at 472. Before ending, the method 400 may send a cancellation message to the follower vehicle(s) (i.e., one or more remote vehicles 10-1, 10-2, . . . , 10-n). If the user has not cancelled the two-way following at 468, the method 400 returns to 448.

If, at 444, the request was not a leader request, the Follow a Friend system 56 determines whether the request was a follower request at 476. If the request was not a follower request, the method 400 returns to 444 to determine whether the request was a leader request. If the request was a follower request at 476, the Follow a Friend system 56 transmits the coordinates of the vehicle 10 as a follower vehicle and receives the coordinates of the lead vehicle and any other follower vehicle(s) (i.e., one or more remote vehicles 10-1, 10-2, . . . , 10-n) at 480. The coordinates may be communicated or transmitted to the Follow a Friend system 56 over a wireless connection, through V2V communication, or by any other communication means.

At 484, the Follow a Friend system 56 initiates "Follower Mode" and provides icons for the vehicle 10, the lead vehicle (i.e., one of remote vehicles 10-1, 10-2, . . . , 10-n), and any other follower vehicle(s) (i.e., one or more other remote vehicles 10-1, 10-2, . . . , 10-n) on the map. If a fixed destination was entered by the lead vehicle, the Follow a Friend system 56 may also provide a visual route (and directions) from the lead vehicle to the destination.

At 488, the Follow a Friend system 56 begins continuous navigation toward the lead vehicle's location. The Follow a Friend system 56 continuously transmits the coordinates of the lead vehicle to the vehicle 10 and any other follower vehicle(s). As such, the Follow a Friend system 56 continuously updates the route and directions to the lead vehicle and provides visual and/or auditory directions to the user.

At 492, the Follow a Friend system 56 determines whether the vehicle 10 has passed the lead vehicle. As previously stated, the Follow a Friend system 56 continuously receives location coordinates for the lead vehicle. Thus, the Follow a Friend system 56 is able to continuously update the map with the location of the lead vehicle and shows when one or more of the follower vehicle(s) passes the lead vehicle.

If the vehicle 10 has passed the lead vehicle at 492, the Follow a Friend system 56 displays a "Follower Passed Leader" warning to the user at 496. If the vehicle 10 has not passed the lead vehicle, the Follow a Friend system 56 determines whether the user has cancelled the two-way following or powered off the vehicle 10 at 500.

The user may cancel the two-way following by selecting a "cancel" icon in the Follow a Friend system 56 or by powering off the vehicle 10. If the user has cancelled the two-way following, the method 400 ends at 472. Before ending, the method 400 may send a cancellation message to the lead vehicle and the other follower vehicle(s). If the user has not cancelled the two-way following at 500, the method 400 returns to 480.

Now referring to FIG. 12, a method 600 for sharing music for the Follow a Friend system 56 is illustrated. Method 600 starts at 604. At 608, the user selects "Share Music" from a list of options on the Follow a Friend system 56 display. Among the list of options may be, for example only, "Friend Request," "Destination," "Lead Request," "Follow Request," and "Share Music."

At 612, the Follow a Friend system 56 prompts the user to select a friend from a list of linked vehicles. The list of linked vehicles are vehicles that are already connected to the vehicle 10 in two-way following, either as a lead vehicle or follower vehicles. During the "Follow Mode," 2-way communication of GPS coordinates occurs, so the already in-place connection between the vehicles may be taken advantage of to share music between the vehicles.

At 616, the Follow a Friend system 56 determines whether the selected vehicle is a follower vehicle. If the vehicle is a follower vehicle, the Follow a Friend system 56 sends a "Share Music" request at 620. If the vehicle is not a follower vehicle at 161, the Follow a Friend system sends a "Listen In" request at 624. The requests may be communicated or transmitted to the Follow a Friend system 56 over a wireless connection, through V2V communication, or by any other communication means that is currently being used between the two vehicles.

At 628, the Follow a Friend system 56 receives a response to the request and determines whether the request to share music was accepted. If the request was not accepted, the Follow a Friend system 56 displays a "Share Music Request Denied" or a "Listen In Request Denied" message to the user at 632. If the request was accepted at 628, the Follow a Friend system 56 displays a "Share Music Request Accepted" or a "Listen In Request Accepted" message to the user and shares music across the vehicle connection at 636. The music may be communicated or transmitted to the Follow a Friend system 56 over a wireless connection, through V2V communication, or by any other communication means that is currently being used between the two vehicles. The method 600 then ends at 640.

Now referring to FIG. 13, another method 700 for sharing music for the Follow a Friend system 56 is illustrated. Method 700 begins at 704. At 708 the Follow a Friend system 56 determines whether the user has received a music request. The music request may be one of a "Share Music" request and a "Listen In" request. If the user has not received a music request, the method 700 continues monitoring for a music request and returns to 708.

If the user has received a music request at 708, the user selects the music request icon (i.e., either the "Share Music" icon or the "Listen In" icon) to open the music request at 712. At 716, the Follow a Friend system 56 prompts the user to select "accept" or "deny" in response to the music request. At 720, the Follow a Friend system 56 determines whether the user selected "accept."

If the user selected "accept," the Follow a Friend system 56 sends an "accept" message to the requesting vehicle at 724. The message may be communicated or transmitted to the requesting vehicle over a wireless connection, through V2V communication, or by any other communication means currently utilized by the vehicles.

At 728, the Follow a Friend system 56 displays "Share Music Request Accepted" or "Listen In Request Accepted" to the user and shares music across the connection. The method then ends at 732.

If the user did not select "accept" at 720, the Follow a Friend system 56 determines whether the user selected "deny" at 736. If the user did not select "deny," the Follow a Friend system 56 prompts the user to select "accept" or "deny" at 716. If the user did select "deny" at 736, the Follow a Friend system 56 sends a "deny" message to the requesting vehicle at 740. The message may be communicated or transmitted to the requesting vehicle over a wireless connection, through V2V communication, or by any other communication means.

At 744, the Follow a Friend system 56 displays "Share Music Request Denied" or "Listen In Request Denied" to the user. The method then ends at 732.

If a shared music connection is established, either by method 600 or by method 700, the user (either the user supplying the music or the user listening in) may cancel the music sharing by selecting a "cancel" icon in the Follow a Friend system 56 or by powering off the vehicle 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A route guidance system for a navigation system comprising:
    an interface configured to establish a friendship connection with a remote lead vehicle, the interface being configured to establish a navigation connection with the remote lead vehicle only after establishing a friendship connection, and the interface being configured to transmit current vehicle coordinates to the remote lead vehicle and to receive remote vehicle coordinates from the remote lead vehicle only after establishing a navigation connection;
    a navigator configured to determine a route and provide directions for a user to the remote lead vehicle; and
    a display configured to visually present a location of the user, the remote vehicle coordinates of the remote lead vehicle, the route from the user to the remote lead vehicle, and the directions.

2. The route guidance system of claim 1, wherein the interface is configured to transmit or receive a friendship request to or from the remote lead vehicle to establish the friendship connection.

3. The route guidance system of claim 1, wherein the interface is configured to transmit or receive a lead-me request or a follow-me request to or from the remote lead vehicle to establish the navigation connection.

4. The route guidance system of claim 1, wherein the interface is configured to transmit or receive the current vehicle coordinates or remote vehicle coordinates over wireless communication to or from the remote lead vehicle.

5. The route guidance system of claim 1, wherein the interface is configured to transmit or receive the current vehicle coordinates or remote vehicle coordinates over vehicle-to-vehicle communication to or from the remote lead vehicle.

6. The route guidance system of claim 1, further comprising a dedicated short range communication system that transmits and receives the current vehicle coordinates to and remote vehicle coordinates from a dedicated short range communication system on the remote lead vehicle.

7. The route guidance system of claim 1, further comprising a navigation screen displaying the location of the user, the remote vehicle coordinates of the remote lead vehicle, the route from the user to the remote lead vehicle, and the directions.

8. The route guidance system of claim 7, wherein the navigation screen is in a vehicle.

9. The route guidance system of claim 7, wherein the navigation screen is on a mobile navigation system, a mobile phone, or a smart phone.

10. The route guidance system of claim 1, wherein the navigator continuously routes the user to the remote lead vehicle.

11. A method of route guidance for a navigation system comprising:
    establishing, through an interface, a friendship connection with a remote lead vehicle;
    establishing, through the interface, a navigation connection with the remote lead vehicle only after establishing a friendship connection;
    transmitting, by the interface, current vehicle coordinates to the remote lead vehicle only after establishing a navigation connection;
    receiving, by the interface, remote vehicle coordinates from the remote lead vehicle;
    determining, by a navigator, a route and providing directions for a user to the remote lead vehicle; and
    visually presenting, by a display, a location of the user, the remote vehicle coordinates of the remote lead vehicle, the route from the user to the remote lead vehicle, and the directions.

12. The method of claim 11, further comprising transmitting or receiving, by the interface, a friendship request to or from the remote lead vehicle.

13. The method of claim 11, further comprising transmitting or receiving, by the interface, a lead-me request or a follow-me request to or from the remote lead vehicle.

14. The method of claim 11, further comprising transmitting and receiving, by the interface, the current vehicle coordinates and the remote vehicle coordinates over wireless communication to and from the remote lead vehicle.

15. The method of claim 11, further comprising transmitting and receiving the current vehicle coordinates and remote vehicle coordinates over vehicle-to-vehicle communication to and from the remote lead vehicle.

16. The method of claim 11, further comprising continuously routing, by the navigator, the user to the remote lead vehicle.

17. The method of claim 11, further comprising notifying the user, by the navigator, of upcoming turns already made by the remote lead vehicle.

18. The method of claim 11, further comprising sharing, by the interface, music between the user and the remote lead vehicle.

19. The method of claim 11, further comprising visually presenting, by the display, a notification when the user passes the remote lead vehicle.

20. The method of claim 11, further comprising distinguishing, by the display, between the user and the remote lead vehicle during the visual presentation.

* * * * *